(12) United States Patent
Luig et al.

(10) Patent No.: US 9,772,048 B2
(45) Date of Patent: Sep. 26, 2017

(54) ROTARY HANDLE FOR A PLUMBING FIXTURE

(75) Inventors: Frank-Thomas Luig, Menden (DE); Kai Huck, Wetter (DE); Bjoern Riedel, Bochum (DE)

(73) Assignee: Grohe AG, Hemer (DE)

( * ) Notice: Subject to any disclaimer, the term of this patent is extended or adjusted under 35 U.S.C. 154(b) by 669 days.

(21) Appl. No.: 12/777,957

(22) Filed: May 11, 2010

(65) Prior Publication Data

US 2010/0288844 A1 Nov. 18, 2010

(30) Foreign Application Priority Data

May 13, 2009 (DE) .......................... 10 2009 021 185

(51) Int. Cl.
G05D 23/185 (2006.01)
F16K 31/60 (2006.01)
F16K 35/02 (2006.01)

(52) U.S. Cl.
CPC ............ F16K 31/60 (2013.01); F16K 35/025 (2013.01); Y10T 137/87668 (2015.04)

(58) Field of Classification Search
CPC ... F16K 31/60; F16K 35/02; Y10T 137/87668
USPC ............... 236/12.11, 12.17, 12.23; 251/8, 14
See application file for complete search history.

(56) References Cited

U.S. PATENT DOCUMENTS

| | | | | |
|---|---|---|---|---|
| 3,559,684 A | * | 2/1971 | Rudewick, III | ...... F16K 11/078 137/625.17 |
| 5,251,811 A | * | 10/1993 | Frankholz | ................... 236/12.16 |
| 5,421,364 A | * | 6/1995 | Humpert et al. | ............. 137/556 |
| 6,045,062 A | * | 4/2000 | Bosio | ........................ B05B 1/16 137/801 |

FOREIGN PATENT DOCUMENTS

| | | | |
|---|---|---|---|
| DE | EP0232454 A1 | * | 8/1987 |
| DE | EP1659322 A1 | * | 5/2006 |
| EP | 1 150 054 B1 | | 9/2005 |

OTHER PUBLICATIONS

Frankholz et al., Rotary Handle for Sanitary Fittings, May 24, 2006, EP1659322A1, Whole Document.*

* cited by examiner

*Primary Examiner* — Larry Furdge
(74) *Attorney, Agent, or Firm* — Muncy, Geissler, Olds & Lowe, P.C.

(57) ABSTRACT

In a rotary handle for a thermostatically controlled valve, which is arranged on an actuator brought out of a valve housing, having a stop body, which acts together with a stop cam provided on the valve housing. It is provided that the stop body is movable in the rotation direction in such a way that by a relative movement between the stop body and the rotary handle, turning of the rotary handle by a rotation angle greater than 360° is made possible.

10 Claims, 2 Drawing Sheets

ROTARY HANDLE FOR A PLUMBING FIXTURE

This nonprovisional application claims priority under 35 U.S.C. §119(a) to German Patent Application No. DE 10 2009 021 185.3, which was filed in Germany on May 13, 2009, and which is herein incorporated by reference.

BACKGROUND OF THE INVENTION

Field of the Invention

The present invention relates to a rotary handle for a thermostatically controlled mixing valve.

Description of the Background Art

In thermostatically controlled mixing valves for plumbing fixtures with temperature sensors/valve elements in the form of expanding-material elements, the relation between the rotation angle of the rotary handle, with which the temperature is selected and adjusted, and the path of the valve element is substantially linear. This means that the path of the valve element per step angle of the rotary handle in a low-temperature range below 25° C., in a mid-temperature range of from 25 to 40° C., and a high-temperature range above 40° C. is substantially uniform.

In plumbing fixtures with thermostats, however, it is expected that fine adjustment of the water quantity is possible specifically in the middle temperature range. For this reason, expanding-material elements having special characteristic curves are selected for temperature sensors. Expanding-material elements with moderately steep characteristic curves assure a fine temperature regulation, but require an especially large rotation range for the rotary handle. This occurs, however, at the expense of the adjustable/selectable cold- or warm-water flow temperatures, because the rotation angle of the rotary handle is restricted by the required fixed stops.

Known from the conventional art, for example, from European Pat. Appl. No. EP 1 150 054 B1, are actuation mechanisms, in which the attempt is made to produce characteristic curves with different slopes in the low- and high-temperature range compared with the medium-temperature range. The characteristic curve of the valve element is influenced by different pretensioned springs, so that its slope in the medium-temperature range is flatter than in the other temperature ranges. Therefore, in the medium-temperature range a broader rotation range should be achieved, without increasing the entire rotation range of a temperature selection handle.

SUMMARY OF THE INVENTION

It is therefore an object of the invention to improve a rotary handle for a thermostatically controlled valve.

The invention provides a rotary handle for a thermostatically controlled valve, which is arranged on an actuator brought out of a valve housing. The rotary handle has a stop body, which acts together with a stop cam provided on the valve housing. A stop body, which is movable in the rotation direction, is provided on the rotary handle, so that a relative movement between the stop body and the rotary handle is made possible in such a way that when the rotary handle is turned from an end position to a second end position, a rotation angle results that is greater than the difference between 360° and the sum of the circular opening angles, which are predetermined by the stop body and the stop cam.

In an embodiment, an actuator can be movable around a rotation axis and is arranged on a valve, the actuator with which a valve element in a valve housing can be moved. A cap-like rotary handle for operating and adjusting the valve is coupled rotation-resistant with the actuator, for example, a spindle. For this purpose, the actuator may have on its outer covering toothing, for example, a thread or grooved toothing, which corresponds to a corresponding inner thread or inner toothing on the rotary handle. Furthermore, a stationary stop cam is arranged on the valve housing or on the housing of a plumbing fixture coaxially to the actuator. This can be arranged, for example, on a stationary stop ring, which may be attached to the valve housing or to the plumbing fixture.

In the interior region of the rotary handle, a stop body is formed integrally or attached, which acts together with the stationary stop cam. The end positions of the valve element in the valve housing are established by the joint action of the stop body and stationary stop cam. In a first end position, which defines, for example, the cold-water end stop and thereby the cold-water flow temperature, a first edge of the stop body lies against a first edge of the stop cam. After rotation of the rotary handle, whose maximum rotation angle is determined in the case of a fixed stop by the width of the stop body and of the stop cam, the second edge of the stop body lies against the opposite second edge of the stop cam. As a result, the second end position of the valve element, for example, of the hot-water end stop and the hot-water flow temperature, is defined.

In prior-art rotary handles with fixed stop bodies, the rotation angle is limited overall to a range which results from a rotation of the rotary handle minus the circular opening angles, which are defined by the stop body and the stationary stop cam.

In the case of the present invention, the stop body is not fixed in a permanent position in the rotary handle, but is provided movable in the rotation direction. In the case of a rotary movement out of an end position of the rotary handle, the stop body is initially carried along together with the rotary handle, until after a certain rotation its second edge contacts the opposite second edge of the stop cam. With further rotation of the rotary handle, the stationary stop cam on the valve housing blocks a movement of the stop body in the rotation direction. The stop body remains in this position, whereas the rotary handle can be moved further relative to said body.

Through the increased rotation angle range of the rotary handle, it is possible to make full use of the physical end positions predetermined by the valve element dimensions and the limit values of the valve with consideration of the characteristic curve.

An embodiment of the invention provides that the rotary handle has a path for the movable stop body in form of a groove on its covering surface. The movable stop body is guided in this groove. The length of the groove also restricts the relative motion between the stop body and rotary handle. Because the rotary handle typically has a cylindrical shape, the movable stop body during actuation of the valve moves on a circular path.

Advantageously, the stop body has a projection, so that it is secured against sliding out of the groove. In this regard, the stop body and groove are provided in a plane in the rotary handle. Depending on the desired rotation angle of the rotary handle, which results from the characteristic curve and the associated thread pitch of the valve element, the groove in the covering surface of the rotary handle surrounds a circular arc with a specific circular opening angle, for example, 30° to 120°.

Overall, therefore, the rotation angle of the rotary handle is established by the sum of the circular opening angle of the groove and the difference angle, which results from 360° minus the sum of the circular opening angles, which are defined by the stop body and the stop cam.

An alternative embodiment of the rotary handle provides that stop body and the groove for guiding the stop body are arranged axially offset relative to one another in the covering surface.

In so doing, it is advantageous when the movable stop body is provided as an annular member, which is used as an additional component in the rotary handle.

According to an embodiment of the invention, the rotary handle may have a fixed stop in addition to the movable stop body. Said fixed stop can be formed integrally either as a single piece on the rotary handle and thereby connected unremovably with it or be arranged removably in said handle. To this end, in the rotary handle on the covering surface an axially oriented groove or an opening or bored hole in radial direction may be provided, in which the fixed stop optionally may or may not be inserted.

Whereas the maximum end positions can be defined by the movable stop with use of the possible adjustments of the valve element, additional defined limit values can be set with the releasable fixed stop. The country-specific requirements for the maximum adjustable temperatures are very different particularly in the case of plumbing fixtures. For example, in countries such as the USA, a maximum temperature of 43° C. is stipulated. The maximum temperature adjustable by the thermostat valve is typically higher than this limit value and lies within the range of the temperature predetermined by the hot-water connection in the house.

Openings or grooves arranged in the rotary handle for the optional arrangement of additional fixed stops thus offer the possibility of creating a base body for a rotary handle, which can be used for all country-specific embodiments of the valve or fixture. This reduces the number of parts that must be kept in stock and the manufacturing cost for tools.

A further embodiment of the invention provides that the rotary handle has another stop in the form of a stop rocker, which can be overcome in a certain rotation direction and serves as a releasable stop opposite to this rotation direction. Certain set positions of the valve element, in the case of thermostat fixtures, for example, a specific comfort temperature, can be indicated to the user by such releasable stops. If an increase in temperature is desired, the removable stop must be deliberately actuated to effect movement from the stop position. In the opposite direction, a beveled stop projection slides over beyond the stationary stop cam.

According to an embodiment of the invention, the rotary handle comprises a handle cap and a support body, whereby the support body is coupled to the actuator. The support body in this regard is formed as a sleeve. The support body in this regard has inner grooved toothing, which corresponds to outer grooved toothing on the actuator. Further, the support body has outer grooved toothing, which acts together with inner grooved toothing on the handle cap. Thus, the handle cap and actuator are coupled rotation-resistant via the support body lying in-between.

Furthermore, a movable stop, a releasable stop, and/or an overcomable stop can be provided on the support body. In this regard, the groove in which the releasable stop is guided can be provided as a slot on the covering surface of the support body. Because the support body is covered from the outside by the handle cap, this visible opening would not interfere. The groove as well for the releasable fixed stop can be formed integrally in the support body. An overcomable stop can also be arranged in the form of a stop rocker, whose pivoting joint is admitted as a metal pin into the support body. In order to be able to return the stop rocker time after time to the stop position, a spring, against whose spring force the stop rocker is moved to release the overcomable stop from the stop position, must be provided in addition on the support body. In the handle cap, then accordingly a push button or actuating button is provided with which it is possible to exert the compressive force on the stop rocker.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
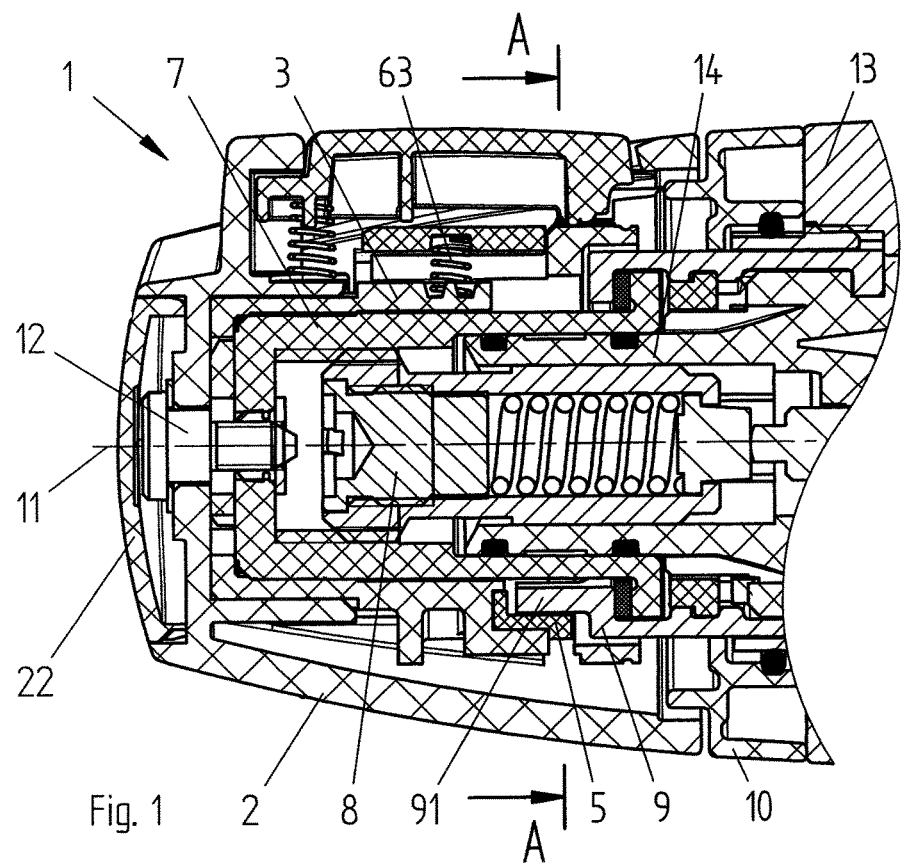
FIG. 1 shows a section through a part of a plumbing fixture with a thermostatically controlled valve and rotary handle.

In the exemplary embodiment shown in FIG. 1 to FIG. 4, an actuator 7 is arranged movable around a rotation axis 11 in a plumbing fixture that is shown in part with a thermostatically controlled valve. Grooved toothing formed on the outer covering is provided on actuator 7. Coaxially to actuator 7, a stationary stop ring 9 is attached to the plumbing fixture or to valve housing 14. A support body 3 with corresponding interior grooved toothing is held rotation-resistant on actuator 7. Support body 3 has a cap shape, which is formed by two cylinders with different diameters. The grooved toothing is also provided in the upper cylinder, which also has a cover and is arranged concentric to the lower larger cylinder. A movable stop body 5, a releasable fixed stop 4, and a stop rocker 6 acting as a releasable stop are arranged on the lower cylindrical part of support body 3; each of these act together with a stationary stop cam 91 on stop ring 9.

The movable stop body 5 is guided in a groove 32 or in a slot of support body 3.

Figure 2:
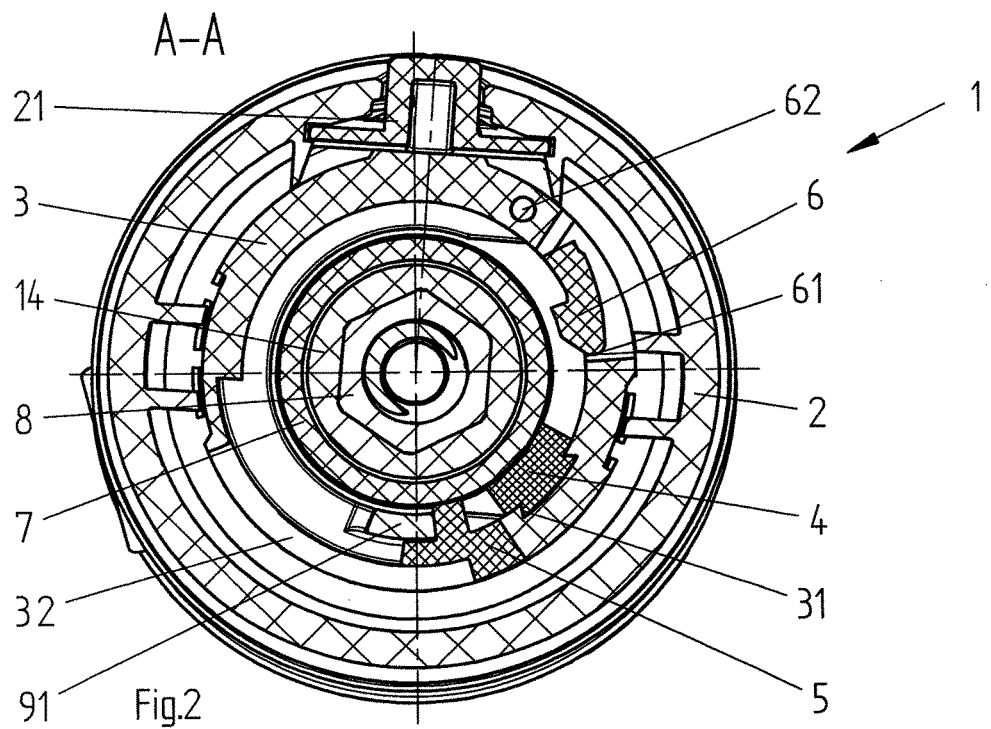
FIG. 2 shows a cross section through the rotary handle of FIG. 1 along the line A-A.

FIG. 2 shows the movable stop body 5 in a stop position. An edge of the movable stop body 5 lies against an edge of the stationary stop cam 91. The cold-water end stop of the thermostatically controlled valve is defined by this position of rotary handle 1. Rotary handle 1 can be turned from this position only counterclockwise.

When rotary handle 1 is turned, the beveled stop projection 61 of stop rocker 6 contacts the stationary stop cam 91. Stop rocker 6 is arranged in a window of support body 3 and mounted, rotatable via an axis 62, on support body 3. An actuating arm, which can be pressed down against the force of a spring 63, is provided on the opposite side of the beveled stop projection 61; as a result, the beveled stop projection 61 moves out of the stop position. After the release of stop rocker 6, which typically indicates to the user a specific water temperature, preferably 38° C., rotary handle 1 can be turned further counterclockwise.

The rotary movement is then ended by a releasable fixed stop 4, which is seated in a groove 31, arranged parallel to rotation axis 11 of rotary handle 1, in support body 3. As soon as releasable fixed stop 4 contacts an edge of stop cam 91, a second end position of rotary handle 1 is achieved.

If releasable fixed stop 4 is removed from groove 31, further turning of rotary handle 1 counterclockwise is possible.

During the turning of rotary handle 1, the movable stop body 5 is carried along in groove 32 of support body 3, until it contacts with its first edge an edge of the stationary stop cam 91. With further turning, movable stop body 5 is moved in groove 32 by means of the stationary stop cam 91. However, it remains in contact with its first edge with stationary stop cam 91. From this point on, rotary handle 1 is moved relative to movable stop body 5 until the end of groove 32 is reached and it abuts against a second edge of movable stop body 5. The second end position of the valve is reached thereby.

Figure 3:
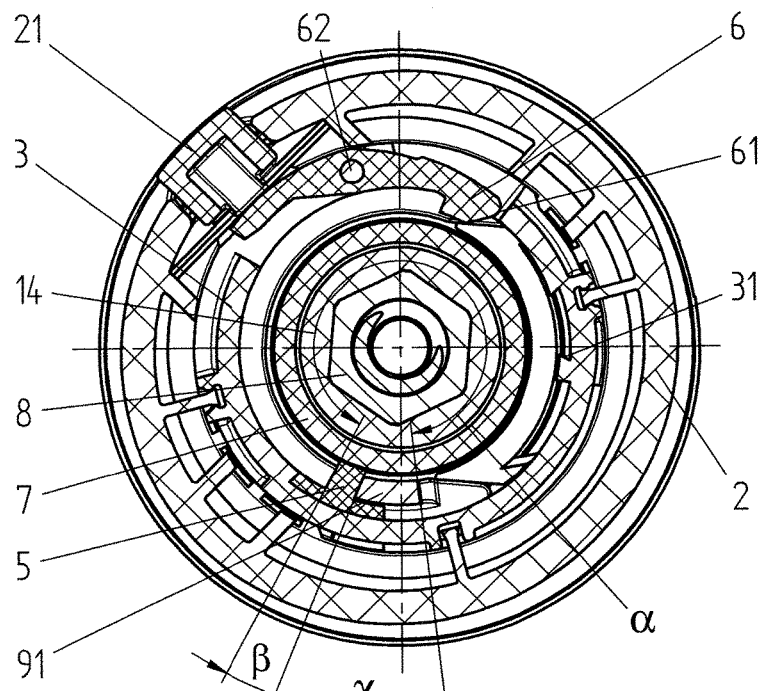
FIG. 3 shows a cross section through a rotary handle according to the invention.

FIG. 3 shows a cross section through a rotary handle 1 of the invention, having a movable stop body 5 and a stop rocker 6. The movable stop body 5 by its width defines a circular opening angle β. In the shown rotation position, the movable stop body 5 lies with one of its edges at the stationary stop cam 91. The hot-water end stop of the valve is defined by this end position. The stationary stop cam 91 also defines a specific circular opening angle χ. Rotary handle 1 can be turned only clockwise from this position. After a turning of about 180°, first the beveled stop projection 61 of stop rocker 6 slides over beyond the stationary stop cam, so that the stop rocker does not represent an obstacle. Then, rotary handle 1 can be turned further clockwise until the movable stop body 5 comes into contact with the opposite edge of the stationary stop cam 91 in regard to the starting situation. At this place, rotary handle 1 has performed a rotary movement with a rotation angle α=360°−(β+χ). From this position onward, movable stop body 5 is blocked by stop cam 91 during further turning of rotary handle 1, as a result of which relative movement between support body 3 and movable stop body 5 occurs. Only when rotary handle 1 is turned so far that the movable stop body 5 lies with an edge against stop cam 91 and with the other edge against a terminal edge of circular groove 31 is the second end position reached, in this case then the cold-water end stop. In this second end position, the rotary handle has performed a rotary movement with a rotation angle α=360°−(β+χ)+δ. Because the circular opening angle δ, which is established by groove 32, is typically larger than the sum of circular opening angles β+χ, which are defined by the movable stop body 5 and the stationary stop cam 91, a rotation angle α greater than 360° results for rotary handle 1.

Figure 4:
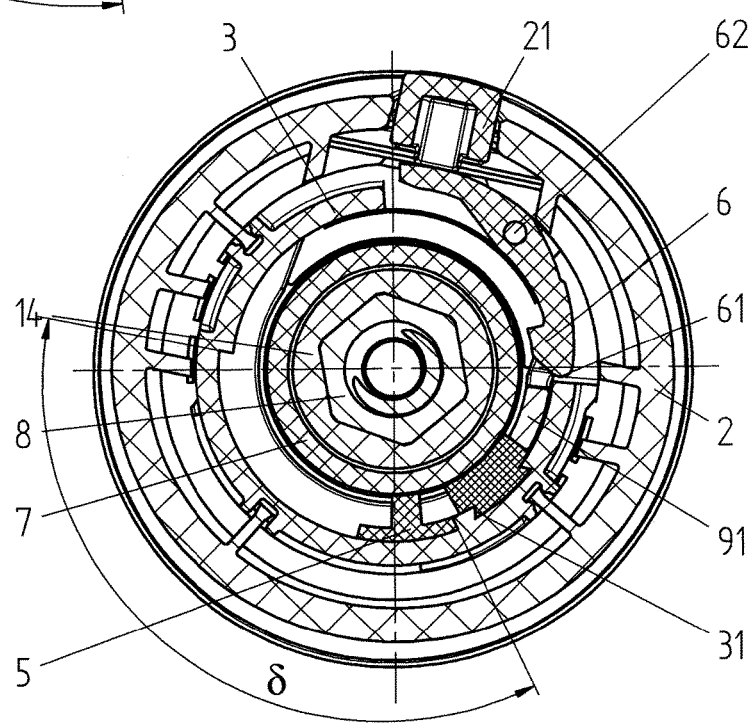
FIG. 4 shows another cross section through a rotary handle according to the invention.

In contrast to this, FIG. 4 shows an embodiment variant of a rotary handle with a releasable fixed stop 4, a movable stop body 5, and stop rocker 6. As already described above, rotary handle 1 here is in the end position for the cold-water end stop.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotary handle for a thermostatically controlled valve, which is arranged on an actuator that extends out of a valve housing, the rotary handle comprising:
    a rotary handle housing;
    a support body provided in the rotary handle housing; and
    a stop body that acts together with a stop cam provided on the valve housing,
    wherein the stop body moves in a rotation direction such that by a relative movement between the stop body and the rotary handle in the direction of rotation, a turning of the rotary handle by a rotation angle is achieved,
    wherein the stop body is positioned within a first groove of the support body, the first groove being elongated to accommodate the movement of the stop body in the rotation direction,
    wherein the rotation angle is greater than a difference angle,
    wherein the difference angle is defined as 360° minus a sum of circular opening angles of the stop body and the stop cam,
    wherein a stop rocker is provided, which can be overcome in a certain rotation direction and serves as a releasable stop opposite to this rotation direction,
    wherein the stop rocker is positioned entirely within an interior of the rotary handle housing when viewed from all directions and at any position of the rotary handle,
    wherein a releasable fixed stop is provided, such that the rotary handle includes the rotary handle housing, the support body, the releasable fixed stop, the movable stop body, the stop cam and the stop rocker, and
    wherein the releasable fixed stop is seated within a second groove of the support body, the second groove being sized so as to maintain the releasable fixed stop in a fixed position.

2. The rotary handle according to claim 1, wherein the movable stop body moves on a circular path.

3. The rotary handle according to claim 1, wherein the first groove, which depends on a characteristic curve of a valve element, has a shape of a circular arc with a defined circular opening angle.

4. The rotary handle according to claim 3, wherein the rotation angle of the rotary handle is established by the circular opening angle of the first groove and the difference angle.

5. The rotary handle according to claim 4, wherein the maximum rotation angle of the rotary handle is defined as the sum of the circular opening angle of the first groove and the difference angle.

6. The rotary handle according to claim 1, wherein the movable stop body has a projection for guidance within the first groove.

7. The rotary handle according to claim 1, wherein the movable stop body and the first groove for guiding the movable stop body are arranged axially offset relative to one another.

8. The rotary handle according to claim 1, wherein the movable stop body is provided as an arc shaped member.

9. The rotary handle according to claim 1, wherein the rotary handle comprises a handle cap, and wherein the support body is coupled to the actuator.

10. The rotary handle according to claim 1, wherein the stop rocker is provided on the support body of the rotary handle.

\* \* \* \* \*